United States Patent [19]

Kester et al.

[11] Patent Number: 5,526,450
[45] Date of Patent: Jun. 11, 1996

[54] NLO WAVEGUIDE "OR" SWITCH AND METHOD THEREFOR

[75] Inventors: John J. Kester; Iyad A. Dajani; Peter M. Ranon, all of Colorado Springs, Colo.

[73] Assignee: The United States of America as represented by the Secretary of the Air Force, Washington, D.C.

[21] Appl. No.: 498,706

[22] Filed: Jun. 30, 1995

[51] Int. Cl.$^6$ ............................................ G02B 6/35
[52] U.S. Cl. .......................... 385/16; 359/328; 359/332; 385/37; 385/122
[58] Field of Search ........................ 385/15, 16, 37, 385/122, 14; 359/326–332

[56] References Cited

U.S. PATENT DOCUMENTS

| | | | |
|---|---|---|---|
| 5,040,864 | 8/1991 | Hong | 385/16 |
| 5,224,194 | 6/1993 | Islam | 385/122 |
| 5,290,485 | 3/1994 | Gotoh et al. | 359/328 X |

Primary Examiner—John D. Lee
Attorney, Agent, or Firm—Thomas C. Stover; Stanton E. Collier

[57] ABSTRACT

Method and apparatus are provided for NLO switching by first providing an amorphous waveguide (wg) encoded with gratings which produce phase-matched SHG in at least two wg modes. Then two input pulsed laser beams (preferably beams split from the same source) are directed into and propagate in the wg, one beam in each of the two modes so as to generate two phase-matched SHG beams in one mode by the use of gratings of the invention. The fundamental beams produce SHG beams which are about 180° out of phase with each other. The two input beams are adjusted such that some of the pulses in their respective pulse trains overlap spatially and temporally, interfere and are cancelled to output a data signal in a resultant pulse train. A detector then reads and processes the output signals. Such NLO switch will allow integrated circuitry to operate at faster rates and to allow, e.g. aircraft to communicate, switch, compute, sense, display and respond much faster than state-of-the-art circuitry based on electronics switching.

16 Claims, 5 Drawing Sheets

OPTICAL MODIFICATION SETUP

OPTICAL SWITCH IN OPERATION

WAVEGUIDE ON BEAM COUPLING APPARATUS

NLO WAVEGUIDE "OR" SWITCH AND METHOD THEREFOR

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a method for "OR" optical switching in a waveguide particularly as activated by nonlinear optical signals and the optical switch so employed.

2. The Prior Art

Nonlinear optical processes have been the basis for many types of information processing. A component of these nonlinear optical processes is known as second harmonic generation (SHG). SHG has been observed in crystalline and oriented materials for over 30 years. The combination of second harmonic signals in a waveguide can be used as a switching mechanism. Numerous geometries have been predicted and tested.

Also in the prior art is U.S. Pat. No. 5,253,258 to Lawandy (1993) which discloses an optically encoded phased-matched SHG waveguide made of certain doped glasses and capable of self-frequency doubling of an input beam. However, there is no indication of employing two modes in the same waveguide for optical switching purposes.

The theory of frequency doubling of laser beams in certain channel waveguides is discussed at length in *Frequency doubling in Ti:MgO:LiNbO$_3$ channel waveguides* by F. Laurell, J.Opt. Soc. Am. B/Vol. 5, No. 2 Feb. 1988, which Article is incorporated herein by reference.

Again while frequency doubling in certain waveguides is disclosed, there is no indication of employing two modes in a single waveguide for optical switching purposes.

Also one device used for the interference of optical signals is called a Mach Zender interferometer. In this device a laser beam that is propagating in a confined waveguide such as a fiber or channel waveguide on an integrated circuit, is split into two channels. One of the channels is modified by an external device that changes the propagation time down the channels. When the two beams are then recombined they destructively interfere if one of the beams has its phase shifted by 180 degrees related to the other beam. This is an electro-optic switch. However, laser beams in waveguides are very sensitive to temperature changes and a slight temperature difference between the channels can distort the phase shift between such beams and reduce the interference therebetween, once recombined, and cause inaccuracies in the above electro-optic switch.

Thus there is a need and market for an optical switch that reduces or obviates the above prior art shortcomings.

There has now been discovered a waveguide optic switch wherein a pair of laser beams are coupled into waveguide to generate interfering SHG beams and act as an on-off optical switch. As two modes of the same waveguide can be maintained at or near the same temperature, the optical switch of the invention has higher accuracy and reliability than previously available.

SUMMARY OF THE INVENTION

Broadly the present invention provides an optical switch comprising:

a) a waveguide (wg), the wg having gratings that produce at least two phase-matched SHG beams from at least two input pulsed laser beams, b) means for directing the input beams into at least two modes of the wg so that the gratings generate the SHG beams in one mode in the wg but out of phase with each other and c) means for adjusting the spatial and temporal overlap of the input beams such that some of the resulting SHG pulses overlap, interfere and cancel and at least one of the resulting SHG pulses does not so cancel to thus output an SHG pulse on-off signal and act as an NLO switch.

The invention also provides a method for optical switching comprising:

a) encoding gratings in a waveguide (wg) that produce at least two phase-matched SHG beams from at least two input pulsed laser beams, b) directing the input beams into at least two modes of the wg so that the gratings generate the SHG beams in one mode in the wg but out of phase with each other and c) adjusting the spatial and temporal overlap of the input beams such that some of the resulting SHG pulses overlap, interfere and cancel and at least one of the resulting SHG pulses does not so cancel to thus output an SHG pulse on-off signal in an NLO switching process.

By "temporal overlap" of pulses as used herein is meant pulses having less than 10 picoseconds difference in peak position, e.g. as illustrated in FIGS. 4 and 6 herein.

By "spatial overlap" as used herein, is meant 50–100% overlap of each beam with the other.

The "waveguide" (wg) referred to herein can be a planar wg. or a channel wg. Both wgs are in a film and confined by the upper and lower surfaces thereof. The channel wg. is also bounded by refractive sidewalls to narrow the optical path or channel in the film. The planar wg does not have such sidewalls and the light transmitted therein can laterally diffuse.

BRIEF DESCRIPTION OF THE DRAWINGS

The invention will become more apparent from the following detailed specification and drawings in which.

DESCRIPTION OF PREFERRED EMBODIMENTS

Figure 1:
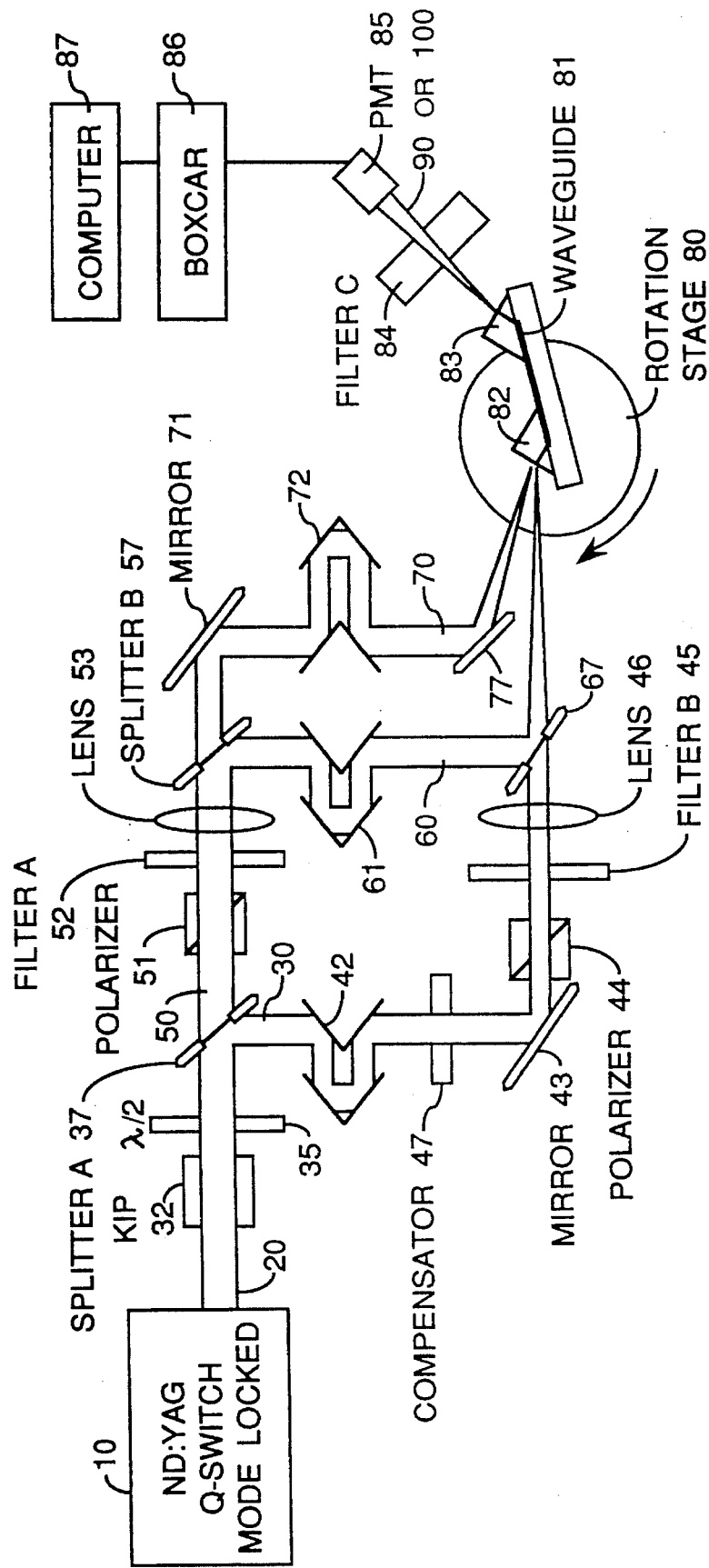
FIG. 1 is an elevation schematic view of an apparatus for optical modification of a waveguide according to the present invention.

Referring in more detail to the drawings, laser beam source 10 outputs laser beam 20 as shown in FIG. 1. A preferred laser source 10 is a mode-locked and Q-switched Nd:YAG laser, but other lasers, wavelengths and pulse lengths which are suitable include, diode lasers, Ti-Sapphire lasers and ion lasers. Laser 10 produces pulses of light at 1.064 µm wavelength. Other wavelengths which are suitable include the transmission region of silica based glases, from 200 to 2500 nm. The use of other waveguide materials allows the use of wavelengths within their transmission region. A preferred laser source is a mode-locked laser which produces mode locked pulses, each having a pulse width of 120–200 picoseconds and a repetition rate of, e.g. 76 MHz but other pulse widths, e.g. of less than 100 femtoseconds and other repetition rates, can be employed per the invention. The pulse repetition rate can be 1 mHz to 1 teraHz or more and preferably is 1 Hz to 1 GHz.

The Q-switched pulses are 250 nanoseconds in length. Within each Q-switched pulse envelope is a series of mode-locked pulses, each having a width of 120–200 picoseconds and a repetition rate of 76 megahertz.

The fundamental beam 20 issuing from laser 10 is modified by a KDP crystal 32 which doubles the frequency of laser beam 20. The doubled frequency beam 30 and fundamental beam 20 initially travel along the same path through a half wave plate ($\lambda/2$) 35 to rotate the polarization of the beams. The doubled frequency beam 30 and fundamental beam 20 are separated by a beam splitting mirror (BSM) 37. The doubled frequency beam 30 travels through a delay line 42 which can be adjusted in length to synchronize the mode-locked pulses within the waveguide 81. Beam 30 is then directed through a compensator 47 which can slightly advance or retard the phase of beam 30. The beam 30 is reflected from mirror 43 and directed through a polarizer 44, adjusted to produce transverse magnetic waves within the waveguide 81. The beam 30 is directed through a filter 45 to remove any fundamental beam 30 which was reflected by BSM 37. The beam 30 is then focused by lens 46 so that the focal point is near the entrance prism 82. The beam 30 can pass through a mirror 67 depending on the optical input requirements for the waveguide 81.

The fundamental beam 20 that is not converted to the doubled frequency beam 30 is transmitted through the BSM 37 and becomes beam 50. Beam 50 is polarized by element 51 to produce transverse magnetic light in the waveguide 81. The beam is directed through filter 52 to remove any frequency doubled light 30 that was transmitted through BSM 37. Beam 50 is then directed through lens 53. Beam 50 is then divided by BSM 57 so that approximately 50% of the light is reflected or transmitted. The reflected beam 60 is directed through a beam delay line 61 to synchronize the mode-locked pulses within the waveguide 81. Beam 60 is reflected from mirror 67 and directed toward the input prism 82.

The portion of beam 50 that is transmitted, beam 70, by BSM 57 is reflected from mirror 71. Beam 70 is directed through a beam delay line 72 to synchronize the mode-locked pulses with the waveguide 81. Beam 60 is then reflected from mirror 77 and directed towards the input prism 82.

Beam 30, Beam 60, and Beam 70 are coupled in the waveguide 81 by a prism coupler 82. The entire waveguide 81 and couplers 82 and 83 can be rotated to allow for optimal coupling of one of the input beams. The remaining input beams are directed by the movement of mirrors in their respective arms to produce optimal coupling into appropriate waveguide modes. Each beam travels a specific and overlaping path in the waveguide depending on its wavelength and the mode into which it is coupled. The delay lines, 42, 61, and 72, in each beam path arm are adjusted to give temporal overlap of the mode-locked pulses to within less than 10 picoseconds as shown in FIGS. 3–6. The beams are also aligned to produce good spatial overlap of the pulses within the waveguide 81. Typically, the lower order modes are used to modify the waveguide. Beam 30 is coupled into the lowest order mode (zeroth order mode). Beam 60 and Beam 70 can be coupled into the lowest and next lowest modes (zeroth and first order mode) depending on the angle of entry.

The light produced within the film is also a frequency doubled beam 90 or 100. This beam is directed through a filter 84 to remove any of the fundamental beams 60 or 70. Beam 90 or 100 is detected by a photomultiplier (PMT) 85. The signal from the photomultiplier 85 is averaged by a boxcar averager 86 and the averaged signal is collected by a computer 87.

To modify the waveguide 81 to produce half of the switch (e.g. to encode optical gratings therein), the following procedure is carried out. Waveguide 81 is first modified by a combination of beams 30 and 60. The level of modification can be determined by blocking the beam 30 and detecting the amount of beam 90 that is produced by the film when only beam 60 is directed through the waveguide 81. When a sufficient level of beam 90 is produced (for facile detection) then the waveguide has been sufficiently modified for half of the optical switch.

To modify the waveguide 81 for the remainder of the switch (e.g. to encode additional optical gratings), the following procedure is carried out. Waveguide 81 is modified by a combination of beams 30 and 70. That is, beam 30 is left in the same waveguiding mode as in the first part of the modification process. However, the phase of beam 30 is changed by about 180° relative to the phase used in the first part of the modification process. The level of modification can be determined by blocking beam 30 and detecting the amount of beam 100 that is produced by the film when only beam 70 is directed through the waveguide 81. Beam 90 and beam 100 are both frequency doubled light traveling in the same waveguiding mode. When a sufficient level of beam 100 is produced then the waveguide has been sufficiently modified for a complete optical switch.

Figure 10:
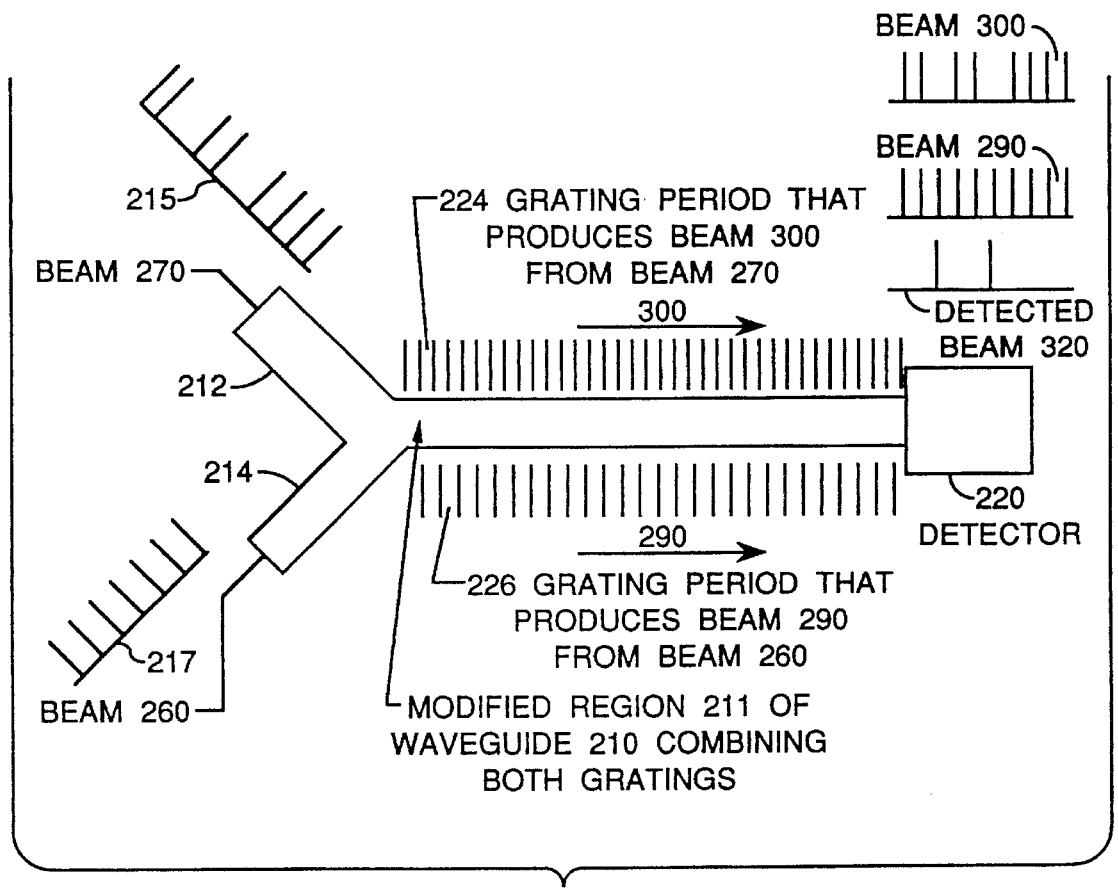
FIG. 10 is a fragmentary elevation schematic view of another waveguide and optical switch embodying the present invention and FIG. 11 is a schematic plan view of a component of the apparatus of FIG. 2.

The level of modification that is required will depend on the specific optical switch that is required. Thus an integrated photodetector can be built into the waveguide to detect the presence of switching behavior, as shown in FIG. 10.

Figure 2:
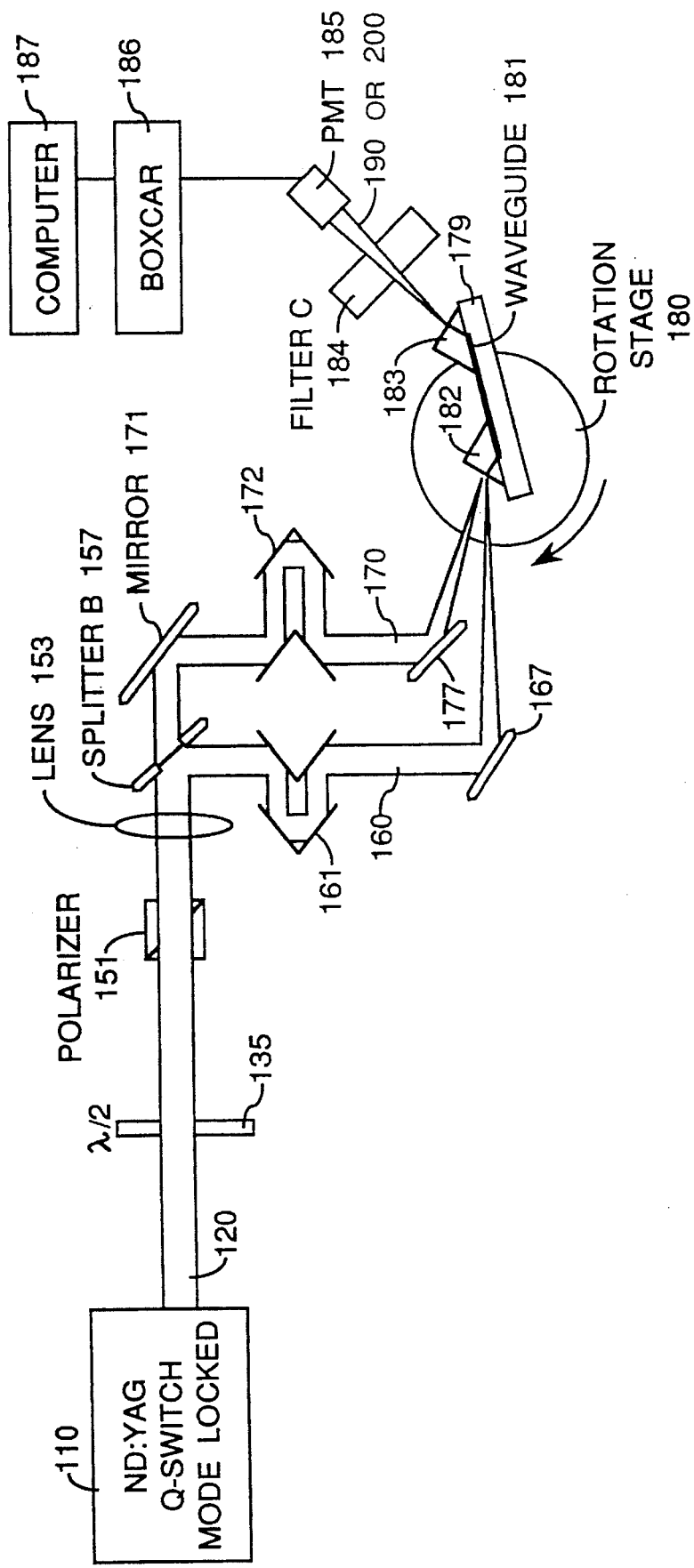
FIG. 2 is an elevation schematic view of an apparatus for testing or operating the waveguide of FIG. 1 as an optical switch.
Figure 3:
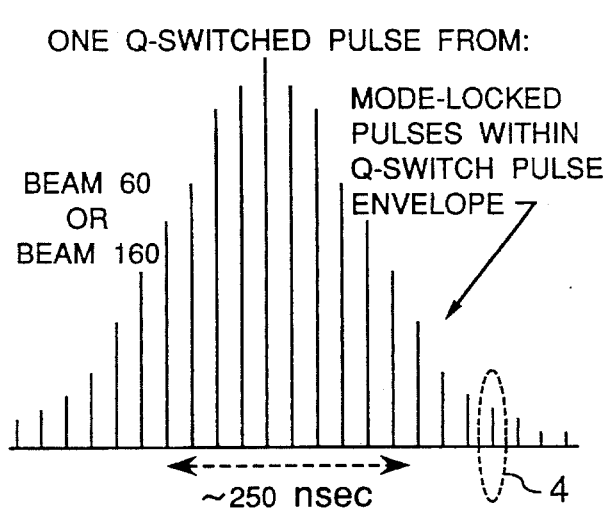
FIGS. 3 and 5 are fragmentary schematic elevation views of laser beam pulses employed in the waveguide and optical switch embodying the present invention.
Figure 4:
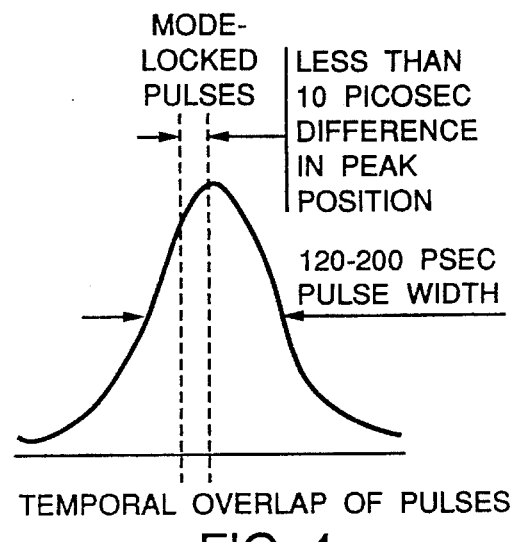
FIGS. 4 and 6 are each enlarged fragmentary schematic elevation views of a sample pulse of the pulse train shown respectively in FIGS. 3 and 5.
Figure 5:
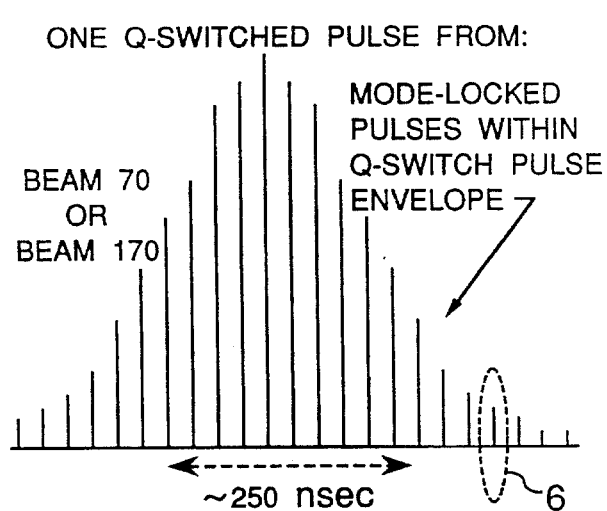
Figure 6:
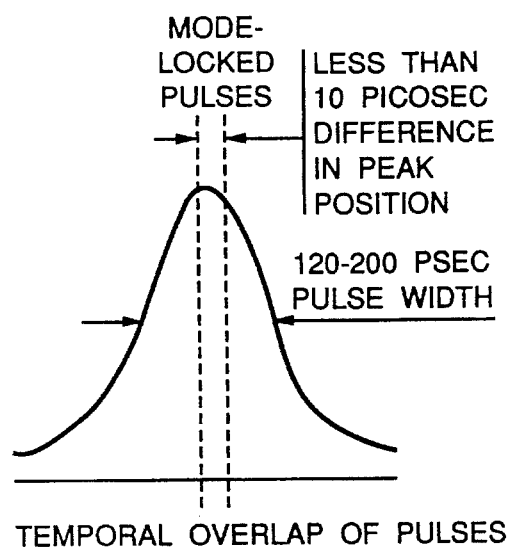
Figure 11:
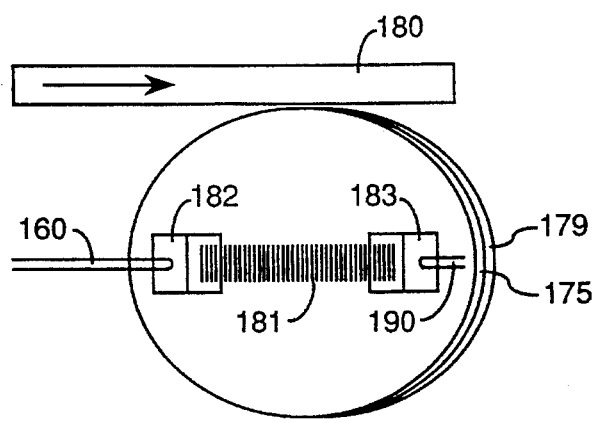

The so encoded waveguide is employed in an optical switch embodying the invention wherein laser 110 outputs laser beam 120 as shown in FIGS. 2 and 11 and described below. A preferred laser 110 is a mode-locked and a Q-switched Nd:YAG laser, but other lasers and wavelengths acceptable include, diode lasers, Ti-Sapphire lasers, and ion lasers. Laser 110 produces pulses of light at 1.064 nm wavelength. The Q-switched pulses are 250 nanoseconds in length. Within each Q-switched pulse envelope is a series of mode-locked pulses, each having a width of 120–200 pico seconds and a repetition rate of 76 megahertz.

The waveguide 81 is made of materials that have substantial transparency at the laser wavelengths chosen for the fundamental and second harmonic. One material is substantially silica glass which has a transparency range approximately 200 nm to 2500 nm. Other materials can be added to the waveguide to improve its NLO qualities such as germanium. Other materials can be used for the waveguide include lithium niobate crystalline films or polymeric materials which support the growth and stability of gratings. The useable wavelength range of these materials depends on their transparency range.

The optical switch of the invention is tested and operated as shown in FIG. 2, wherein a fundamental beam 120 issuing from the laser 110 is directed at a half wave plate ($\lambda/2$) 135 to change the polarization of the beam 120. The beam 120 is polarized by element 151 to produce substantially transverse magnetic waves in the waveguide 181. The beam 120 is then directed through a lens 153 to produce a focused beam at the input prism 182. The beam 120 is split by a beam splitter 157 into two approximately equal intensity beams, 160 and 170. Each beam 160 and 170, is directed through a delay line 161 and 172, respectively, to allow for temporal overlap of the pulses of the beams in the waveguide 181. Each beam (160 and 170) is then reflected by a mirror and directed into the input prism coupler 182 as shown in FIGS. 2 and 11.

The waveguide 181, in film 175 and prisms 182 and 183, on substrate 179, can be rotated, on rotor 180, to allow coupling of one of the beams into the waveguide, e.g. beam 160, as indicated in FIGS. 2 and 11. Then the other beam is coupled into the waveguide 181 by movement of the reflecting mirrors, 171 and 177 or 167 and 157.

The switch is tested according to the following procedure, with reference to FIG. 2. When neither beam 170 or 160 is on, then no light is detected by the PMT 185. When beam 160 is coupled into the waveguide then a frequency doubled beam 190 is generated and detected by PMT 185. When beam 170 is coupled into the waveguide then a frequency doubled beam 200 is generated and detected by PMT 185. Beams 190 and 200 are generated in the same waveguiding mode because the same frequency doubled beam 30 in FIG. 1, was used to modify the waveguide and its mode was not changed during the modification. When both of the beams 160 and 170 are coupled into the waveguide in spatial and temporal overlap, pulses of the frequency doubled beams 190 and 200 can interfere. An optimized modification will cause complete interference between pulses of the two frequency doubled beams and no output (as to the interfered pulses) will be detected. For example, to enhance the above pulse interference, compensators 163 and 173 are employed in the circuit of FIG. 2 and are adjusted respectively in beams 160 and 170, to allow for maximum interference of the frequency doubled beams 190 and 200.

Figure 7:
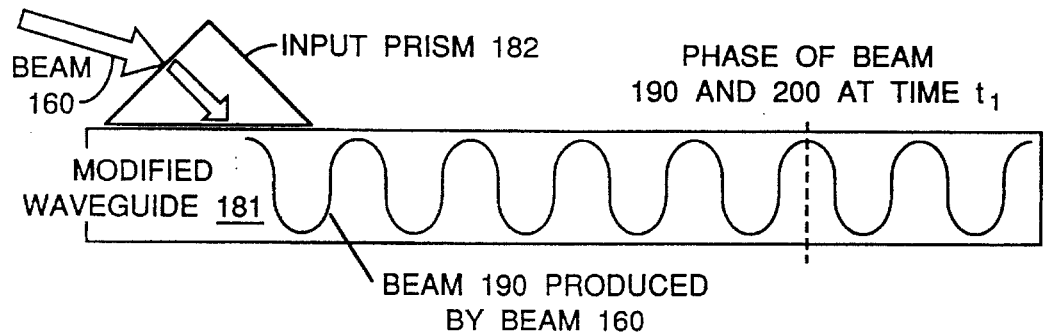
FIGS. 7, 8 and 9 are fragmentary schematic elevation views of input pulse beams and generated resultant SHG beams in a waveguide embodying the present invention.
Figure 8:
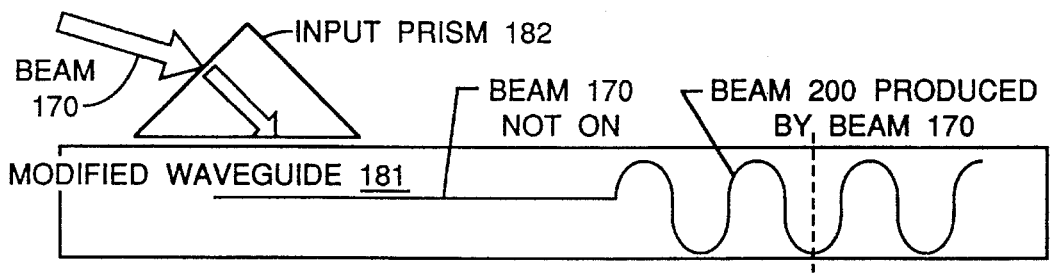
Figure 9:
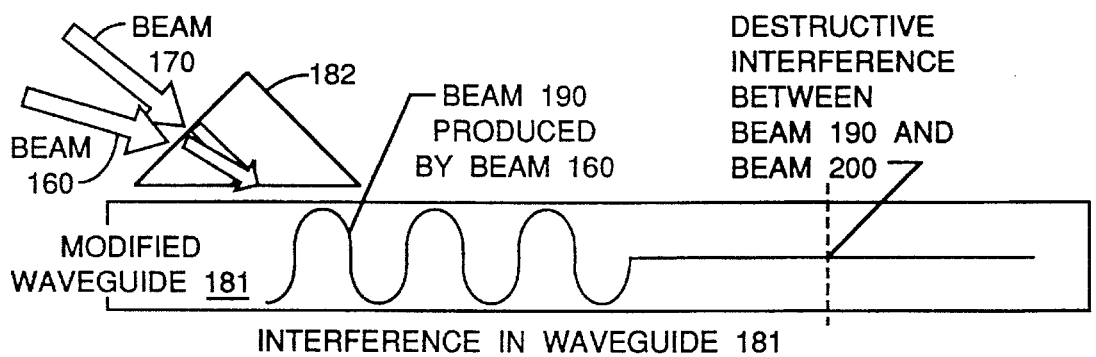

A summary of the above tests is shown in Table 1 and corresponds to an exclusive OR gate. The second and fourth sets of data in Table 1 are indicated in FIGS. 7, 8 and 9.

TABLE 1

| An Exclusive "OR" Gate | | |
|---|---|---|
| BEAM 160 | BEAM 170 | Beam 190 or 200 |
| 0 | 0 | 0 |
| 1 | 0 | 1 |
| 0 | 1 | 1 |
| 1 | 1 | 0 |

Another embodiment of this invention is shown in FIG. 10. Such embodiment is for an optical switch which has been manufactured for use with an integrated circuit. The modified waveguide is a channel waveguide 210 which lies in the plane of FIG. 10. The channels 212 and 214 in the waveguide, are illustrated in FIG. 10 as having a "Y" configuration with Beams 260 and 270 entering said channels as shown. Beams 260 and 270 are a series of pulses of equal height. Beams 260 and 270 join and co-propagate into a single channel (in spatial and temporal overlap) which has been modified to generate SHG beams 290 and 300, as discussed above. The SHG beams 290 and 300 are sensed by beam detector 220 which is tuned to the desired SH frequency. Alternatively, a filter mounted before the detector 220 in the beam path, removes, e.g. the fundamental beams. Table 1 can also indicate the results of the interaction of beams 260, 270 and 300 by comparing (or substituting) them with beams 160, 170 and 200 respectively, in such Table.

In sum the presence of either beam 290 or beam 300 at the output of the waveguide is detected by beam detector 220 which converts one beam or the other to an electrical signal. When both beams are present, are out of phase and have equal intensity pulses, they can interfere with one another and no signal is detected by beam detector 220 as to such pulses. However, such interference occurs when the two beams have opposed overlapped pulses. When some of the opposed pulses are not overlapped, they are subjected to little or no interference and are detected as signals by beam detector 220 in the manner indicated by resultant beam 320 in FIG. 10.

In another embodiment of the invention, the waveguide of FIG. 10 is combined with another waveguide (not shown) to form a subsequent switch.

Other methods exist for modifying a channel waveguide. These methods include the poling of the region of the waveguide to be modified. Poling of the waveguide includes the application of an electric field which has a specific spatial dependence down the waveguide to produce the correct modification. The electric fields are applied to the waveguide at elevated temperatures, typically between 180°–200° C. The waveguide is then cooled with the electric field applied. When the waveguide is returned to room temperature the electric fields are removed and the waveguide is said to be "poled". Bulk glasses and single crystals have been poled to produce nonlinear optical signals. For a further discussion of poled waveguides see an Article by E. J. Lim et al in *Electronics Letters*, Vol. 25, No. 3, Pg 174 (1989), incorporated herein by reference.

Another method to modify the waveguide is to irradiate the waveguide with beams of electromagnetic radiation or particles. The particles can be electrons, or neutral or ionized atomic or molecular species. The radiation or particles are directed at the waveguide surface to produce spatially modified regions of the waveguide. The spatial variations of the modified waveguide will be the same as that produced by the optical modification described above and shown in FIG. 1. For a further discussion of the radiation method see an Article by P. G. Kazansky et al, Optics Letters 18, 693 (1993), incorporated herein by reference.

The following example is intended to illustrate the nonlinear optical switch of the present invention and should not be construed in limitation thereof:

EXAMPLE 1

A germania doped silica waveguide was optically modified to produce SHG at 532 nm per the waveguide modification method shown in FIG. 1 hereof. The waveguide was made of silica doped with about 6 atomic % of germania.

The germania was substantially oxidized. Laser light having a 1.06 μm wavelength from a Nd:YAG Laser, was propagated in the waveguide. The laser beam was mode-locked at 76 MHz and Q-switched at 1.2 KHz. The power of the fundamental wavelength incident on the waveguide for modification and for testing was about 220 mW. The power of the second harmonic wavelength incident on the waveguide for modification was approximately 300 μW. The second harmonic wavelength used to modify the waveguide, was produced by illuminating a KDP crystal with the fundamental wavelength beam.

For the optical modification process, the fundamental and second harmonic wavelengths were focused and coupled into the waveguide by a prism. Because of the dispersion of the prism, the incident angle of the two beams onto the prism were separately controlled to allow coupling into particular waveguiding modes of the film. The fundamental beam was coupled into the waveguide's zeroth order mode and the second harmonic beam was coupled into the first order mode. When the pulses of the two beams were overlapped both spatially and temporally, a film generated second harmonic signal was detected and grew in the first order mode to a saturated value of 2.0 nW.

On a different spot of the same waveguide, a film generated second harmonic signal was grown by combining the fundamental wavelength in the first order mode and its second harmonic in the first order waveguiding mode. When the pulses of the two beams were properly overlapped both spatially and temporally, a film generated second harmonic signal was detected in the first order mode to a saturated value of 5.6 nW.

The so encoded waveguide is incorporated into an optical switch such as shown in FIGS. 2 and 11 and beams 160 and 170 are transmitted to the waveguide 181 in temporal overlap, which produces interfering SHG beams 190 and 200 respectively and an output beam of an on-off pulse train. That is, the NLO switch of the invention produces on-off switching such as indicated in FIGS. 7–9, as well as a stream of binary data (on-off) signals in the manner indicated by the resultant beam 320 shown in FIG. 10.

An advantage of the NLO switch of the present invention is that the waveguide thereof is of amorphous material in the form of, e.g. a thin film. Unlike the crystal waveguides of the prior art, the amorphous waveguides of the present invention can readily be incorporated into present-day integrated circuits.

The waveguide of the NLO switch of the present invention is made of amorphous materials that preferably include silica. Thus such waveguide can be made of silica doped with 1–10 at. % and preferably 6 at. % of Germania ($GeO_2$), 1–10 at. % Titania ($TiO_2$) or 1–10 at. % Phosphorus. However, such waveguide can also be made of of Germania or Titania within the scope of the invention.

Such waveguide is desirably incorporated in thin films, 0.1–50 and preferably 0.7–5.0 microns thick.

Thus in the NLO switch of the present invention, pulse interference occurs because two fundamental beams are input into different modes of the same waveguide path to generate two SHG signals. The SHG signals are generated in the same (usually the lowest order) waveguiding mode for pulse inteferance purposes. The input (and SHG beams) however, must be adjusted such that the resultant SHG beams are about 180° out of phase, as indicated in FIGS. 4 & 6 and 7 to 9.

Assuming Spatial Overlap

If the pulses of the input beams do not have temporal overlap in the waveguide, they do not interfere and an SHG beam is detected. If all of the pulses of the SHG beams have temporal overlap, they all interfere and there is no output beam to be detected. However if some of the pulses of the SHG beam do not have temporal overlap and some do, then a resultant output signal or pulse train is detected.

As noted above, a novel feature of the NLO switch of the present invention, e.g. per FIGS. 7–9 or 10, is that it combines two fundamental input beams in two different waveguiding modes of the same waveguide. The wg is encoded to have phase-matched SHG gratings in each of the two modes so as to produce two SHG beams (from the input beams) in one waveguiding mode. Thus when input beams of different pulse trains are adjusted for spatial and temporal overlap, interfering pulses of the resulting two SHG beams will cancel and the waveguide will output a resultant SHG beam having a pulse train of non-cancelled pulses and gaps, to provide an NLO data signal.

A detector then reads and processes the data signals. The detector can be a photomultiplier (PMT) or a solid state detector, e.g. a photodiode, for detecting a signal or lack thereof from said waveguide.

Such NLO switch will allow integrated circuitry to operate at faster rates and to allow, e.g. aircraft to communicate, switch, compute, sense, display and respond much faster than state-of-the-art circuitry based on electronics switching. Also per the invention high frequency pulses of laser light can transmit video and audio signals through fiber optics for further processing.

What is claimed is:

1. An NLO switch comprising,
    a) a waveguide (wg), said wg having gratings that produce at least two phase-matched SHG beams from at least two input pulsed laser beams,
    b) means for directing said input beams into at least two modes of said wg so that said gratings generate said SHG beams in one mode in said wg but out of phase with each other and
    c) means for adjusting the spatial and temporal overlap of said input beams such that some of the resulting SHG pulses overlap, interfere and cancel and at least one of the resulting SHG pulses does not so cancel to thus output an SHG pulse on-off signal and act as an NLO switch.

2. The NLO switch of claim 1 having a pulsed laser beam source and a beam splitter which provides said two input beams and a delay line for each of said two input beams to adjust the temporal overlap thereof for input into said wg.

3. The NLO switch of claim 1 having a detector selected from the group, consisting of a PMT and a photodiode for detecting a signal or lack thereof from said waveguide.

4. The NLO switch of claim 1 having means for transmitting two input fundamental laser beams with different pulse trains, one beam into each of said two modes, to generate two SHG beams in one mode of said wg wherein at least some of the pulses of each pulse train overlap, interfere and are cancelled, to output a data signal of at least one pulse from said waveguide.

5. The NLO switch of claim 4 wherein said wg is "Y" shaped and each of said fundamental beams is input into a separate branch of said "Y" with said SHG gratings being located at least in the stem of said "Y" shaped waveguide.

6. The NLO switch of claim 1 having means for varying the wavelength of each input beam from 200 nm to 2500 nm.

7. The NLO switch of claim 1 having means for varying the pulse repetition rate from 1 mHz to 1 teraHz.

8. The NLO switch of claim 1 having a wg selected from the group consisting of a planar wg and a channel wg.

9. A method for NLO switching comprising,
a) encoding gratings in a waveguide (wg) that produce at least two phase-matched SHG beams from at least two input pulsed laser beams,
b) directing said input beams into at least two modes of said wg so that said gratings generate said SHG beams in one mode in said wg but out of phase with each other and
c) adjusting the spatial and temporal overlap of said input beams such that some of the resulting SHG pulses overlap, interfere and cancel and at least one of the resulting SHG pulses does not so cancel to thus output an SHG pulse on-off signal in an NLO switching process.

10. The method of claim 9 wherein a PMT detects said signal or lack thereof.

11. The method of claim 9 wherein said two input laser beams are divided off a common laser beam and the temporal overlap of said beams is adjusted by means of delay lines applied respectively, to each of said two input beams.

12. The method of claim 11 wherein the pulses of said two input laser beams are mode-locked and at least some of the pulses of one input beam are in temporal overlap with at least some of the pulses of the other input beam.

13. The method of claim 9 wherein two input laser beams with different pulse trains are directed, one beam into each of said two modes of said wg, to generate two SHG beams in one mode of said wg, wherein at least some of the pulses of each pulse train overlap, interfere and are cancelled, leaving at least one non-interfered-with and non-cancelled pulse transmitted in said wg to output a data signal in the form of one or more on-off pulses.

14. The method of claim 9 wherein the wavelength of each input beam is varied from 200 nm to 2500 nm.

15. The method of claim 9 wherein the pulse repetition rate of each input beam is varied from 1 mHz to 1 teraHz.

16. The method of claim 9 wherein said input beams are directed into said gratings to generate SHG beams in said one mode in said wg but about 180° out of phase with each other.

* * * * *